United States Patent [19]

Urich

[11] Patent Number: 5,082,188
[45] Date of Patent: Jan. 21, 1992

[54] APPARATUS FOR PROCESSING MATERIAL

[75] Inventor: Oren D. Urich, Windsor, Colo.

[73] Assignee: Sterling Grinding Company, Inc., Sterling, Colo.

[21] Appl. No.: 257,438

[22] Filed: Oct. 13, 1988

Related U.S. Application Data

[63] Continuation-in-part of Ser. No. 90,792, Aug. 28, 1987, abandoned.

[51] Int. Cl.$^5$ ............................................. B02C 13/286
[52] U.S. Cl. ......................................... 241/56; 241/69; 241/78; 241/101.7; 241/152 A; 241/186 A; 241/186.2; 241/188 R
[58] Field of Search .................. 241/101.7, 79, 186 A, 241/78, 189 R, 195, 186.4, 194, 152 A, 186.2, 186 R, 56, 186.3, 55, 188 R, 69

[56] References Cited

U.S. PATENT DOCUMENTS

| | | | |
|---|---|---|---|
| 2,016,496 | 10/1935 | Holbeck et al. | 241/56 X |
| 2,997,968 | 8/1961 | Fitzpatrick . | |
| 3,197,084 | 7/1965 | Van Der Lely et al. . | |
| 3,208,167 | 9/1965 | Vincent . | |
| 3,214,105 | 10/1965 | Owens et al. . | |
| 3,584,334 | 6/1971 | Moriya | 241/188 R X |
| 3,610,542 | 10/1971 | Yamagishi | 241/56 X |
| 3,675,856 | 7/1972 | Kverneland . | |
| 3,749,321 | 7/1973 | Rosier . | |
| 3,782,642 | 1/1974 | Trafford . | |
| 4,142,686 | 3/1979 | Houle . | |
| 4,214,716 | 7/1980 | Jadouin . | |
| 4,227,654 | 10/1980 | Seefeld . | |
| 4,325,516 | 4/1982 | Ismar . | |
| 4,469,210 | 9/1984 | Blumer et al. . | |
| 4,477,028 | 10/1984 | Hughes | 241/69 |

FOREIGN PATENT DOCUMENTS

| | | |
|---|---|---|
| 230798 | 4/1910 | Fed. Rep. of Germany . |
| 1224552 | 9/1966 | Fed. Rep. of Germany . |
| 3324467 | 1/1985 | Fed. Rep. of Germany . |
| 708098 | 7/1931 | France ............................ 241/56 |
| 1120386 | 7/1956 | France . |
| 2278238 | 2/1976 | France . |
| 7425289 | 2/1976 | France . |
| 36662 | 3/1979 | Japan ......................... 241/188 R |
| 366415 | 2/1963 | Switzerland . |
| 882444 | 11/1981 | U.S.S.R. . |
| 910189 | 3/1982 | U.S.S.R. . |
| 1087114 | 4/1984 | U.S.S.R. . |

Primary Examiner—Mark Rosenbaum
Attorney, Agent, or Firm—Dean P. Edmundson

[57] ABSTRACT

Apparatus is disclosed for reducing the particle size of various materials (e.g., grains, forage materials, fibrous materials, bulk materials, disposed materials, etc.). The apparatus includes a housing including a circular interior wall, a rotor member which is rotatably mounted in the housing, a plurality of blades or hammers attached at one end to the periphery of the rotor, drive means for driving the rotor within the housing, and feed means for feeding the material to the rotor in substantially full face feed. An annular channel or chamber is defined between the rotor and the interior wall of the housing. The blade members extend into the channel or chamber. After the material has been reduced in particle size by the blades or hammers it passes into a cavity adjacent to the annular channel or chamber and the rotor. The cavity includes an unrestricted discharge opening for exit of the processed material.

21 Claims, 9 Drawing Sheets

APPARATUS FOR PROCESSING MATERIAL

CROSS-REFERENCE TO RELATED APPLICATION

This application is a continuation-in-part of my co-pending application Ser. No. 090,792, filed Aug. 28, 1987 now abandoned.

FIELD OF THE INVENTION

This invention relates to apparatus and techniques for processing material and reducing such material to particles of a desired size.

BACKGROUND OF THE INVENTION

There has always been a need for processing various materials to reduce particle size. For example, grains and forage materials are routinely ground or cut into small particles prior to feeding such materials to animals or otherwise using or processing such materials. Numerous other materials in a wide variety of industries are also routinely chopped, cut, ground, or otherwise reduced in particle size before being further processed or used.

For example, in addition to the grains and forage materials described above, other materials which must be reduced in particle size include waste wood, paper, waste products (such as spoiled food, e.g., fruits and vegetables), plant and animal waste products, compost, metal, glass, etc. Other recyclable products and materials are also reduced in particle size before they can be effectively used.

Conventional devices which are routinely used for grinding or reducing particle size of materials typically include a rotating wheel having hammers on the periphery thereof. A curved screen is positioned in close proximity to the path of the rotating hammers. The screen typically covers only a small portion of the circumference of the rotating wheel with hammers. The remainder of the grinding chamber is closed to prevent escape of the material being ground.

The material being reduced in particle size is repeatedly hammered by the rotating hammers until it is able to pass through the openings in the screen. For example, this is the operation of a conventional hammer mill which is used to grind grain and other such materials.

Such types of hammer mills are described, for example, in U.S. Pat. No. 4,325,516; German Patent 3324467A; and U.S.S.R. documents 1087114A and 910189.

Another variation of hammer mill is a so-called tub grinder in which the material to be ground is placed in a very large tub (several feet in diameter) The tub has an opening in the floor in which the outer portion of a rotating wheel is positioned. On the periphery of the wheel there are fastened a number of hammers. A screen is positioned below the floor of the tub and in close proximity to the ends of the hammers as the wheel is rotated. The screen covers a small portion of the circumference of the rotating wheel. When the wheel is rotated at high speed the hammers pound on the material in the tub until the material is able to pass through the openings in the screen. The tub also rotates so as to urge the material into the path of the rotating hammers on the wheel. A variation of this type of tub grinder is described in U.S. Pat. No. 4,142,686.

There are numerous disadvantages associated with both the hammer mill machines and the tub grinders. For example, both types of machines are limited in capacity because the material must pass through small openings in a screen in order to escape the grinding chamber. The screen only covers a portion of the circumference of the rotating wheel. Furthermore, in both types of machines the material being processed is fed only to a very small fraction of the circumference of the rotating wheel. Therefore, there is a small feed area and a small grinding area presented.

Another disadvantage of the tub grinder is that a large amount of horsepower is required for the volume of material processed. Another disadvantage of the tub grinder is that it has a large number of moving parts which are subject to a great amount of wear. Furthermore, the tub grinder is limited in capacity in spite of the large size of the machine. Still another disadvantage of the tub grinder is that it can throw material into the air well above the top of the tub. This presents a very dangerous situation, for example, when there are rocks or other heavy objects present in the material being ground.

Although roller mills have been used to process small grains, such devices are not useful for reducing particle size of various other materials. Forage grinders utilizing a large reel with knives at the edge have also been used for chopping forage materials; but such devices are not useful for grains or other products of small particle size.

Various other structures are described in the patents and documents listed below. None of such structures is suitable for the purposes of the present invention:

U.S. Pat. Nos. 2,997,968 4,227,654 3,197,084 French Patent 1,120,386 U.S. Pat. No. 3,208,167 French Patent 7,425,289 U.S. Pat. No. 3,675,856 Germany Patent 1,224,552 U.S. Pat. No. 3,749,321 Germany Patent 230,798 U.S. Pat. No. 3,782,642 Switzerland 366,415 U.S. Pat. No. 4,469,210 U.S.S.R. 882,444

Pulverizing devices have been described in U.S. Pat. Nos. 4,214,716 and 3,214,105. Such devices include an upright rotor supported at upper and lower ends and including a plurality of hammers. One of the devices includes stationary striker blades. Such devices do not include a cavity below the rotor to receive processed material, nor do such devices have the capability to process bales of bulk material, among other things. They also have other operating limitations and disadvantages.

There has not heretofore been described a material processor for reducing particle size having the advantages provided by the apparatus of the present invention.

SUMMARY OF THE INVENTION

In accordance with the present invention there is provided apparatus for processing materials of all types to reduce particle size. The apparatus comprises:
(a) a housing including a circular interior wall;
(b) a rotor member being adapted to be rotatably driven within the housing; the rotor member including a feed side and a discharge side;
(c) a plurality of blade members having first and second ends, wherein the first end of each blade is attached to the rotor and the second end of each blade extends outwardly from the rotor;
(d) drive means adapted to drive the rotor in a rotatable manner within the housing;
(e) feed means adapted to feed the material to the feed side of the rotor in substantially full face feed.

An annular channel or chamber is defined between the interior wall of the housing and the rotor member. The blade members project into the channel or chamber when the rotor is rotated. A cavity is defined within the housing adjacent the discharge side of the rotor member to receive material processed by the rotor member.

The annular channel encompasses a full 360° circular, ring-shaped area within the housing. The interior wall of the housing defines the outer edge of the grinding chamber and the rotor periphery defines the inner edge thereof. A discharge opening is adjacent to the cavity. For example, when the rotor is in a horizontal plane, the cavity is located just below the rotor and the annular channel or chamber and communicates with it. When the rotor is in a vertical plane, the cavity is located just rearwardly of the channel and the rotor. An unrestricted discharge opening is preferably communicating with the cavity.

Preferably the material to be processed is fed into the annular channel or chamber at all positions around the rotor member. In other words, the material to be processed is fed to the blade members completely around the periphery of the rotor (i.e., full face feed). This provides for much more rapid and efficient processing of the material in the annular chamber than is the case with conventional grinders. As a result, material can be processed very quickly using smaller engines or tractors than possible with previous machines and techniques.

The apparatus also produces a very uniform comminution of material being processed. The design of the apparatus also results in less wear and stress on the components than is the case with conventional grinding apparatus. As a result, maintenance costs are less.

The apparatus can also be provided with more than one grinding chamber. That is, the material being processed can be first reduced to a given particle size in one chamber and then reduced to a smaller particle size in a second chamber. For example, the material (e.g., ear corn) can be cut to a particular particle size by means of knives, then the material can pass through a screen to another chamber where the blades or hammers on the periphery of the rotor further reduce the particle size of the material before it passes into the cavity and then exits through the discharge opening.

The apparatus of the invention can be provided in various embodiments and various sizes. It can be provided, for example, with the rotor member in either a horizontal plane or in a vertical plane. Various types of feeding devices can be used to feed the material into the rotor for processing. For example, when the rotor member is in a horizontal plane, a hopper is placed above the rotor and gravity pulls the material from the hopper and into the rotor.

A significant advantage of the apparatus of this invention is that there is a 360° grinding area around the rotor. In other words, the material to be processed can enter the channel or chamber between the rotor and the interior wall of the circular housing at any point. The material cannot proceed to the cavity or the discharge opening without passing through the grinding area or chamber where the blades or hammers reduce the particle size of such material. This is unique as compared to other types of grinding devices.

The apparatus of this invention is capable of performing all the functions of previously available grinders and cutters in a rapid and efficient manner. Materials of virtually any type and description can be processed with this apparatus.

The apparatus of this invention can be provided on a wheeled frame if desired so that it can be towed to the desired location for use. It may be powered by an electric motor or gasoline or diesel engine carried on the frame supporting the apparatus, for example. Alternatively, the apparatus can be powered by the power-take-off shaft of a tractor.

As yet another alternative, the apparatus may be mounted on a truck bed or truck frame and transported to any desired location for use. For example, when the apparatus is intended for grinding large hay bales several feet in diameter and in length (either square bales or round bales), it is very desirable to mount the apparatus on a truck bed or truck frame with a long horizontal hopper or feed conveyor for supporting large bales to be processed and for advancing the bales into the feed side of the rotating rotor. The capacity and efficiency of such apparatus far exceeds that of conventional tub grinders which have been used for this purpose.

Other advantages of the apparatus of this invention will become apparent from the following detailed description and the appended drawings.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
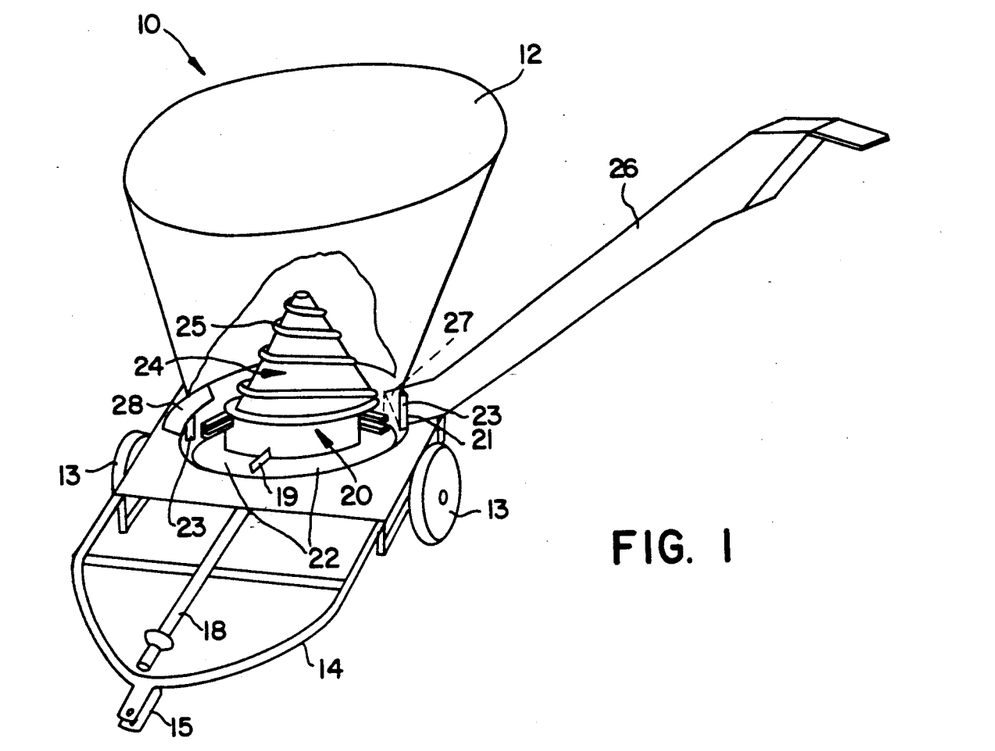
FIG. 1 is a partial cut-away perspective view of one embodiment of material processor of the invention.
Figure 1A:
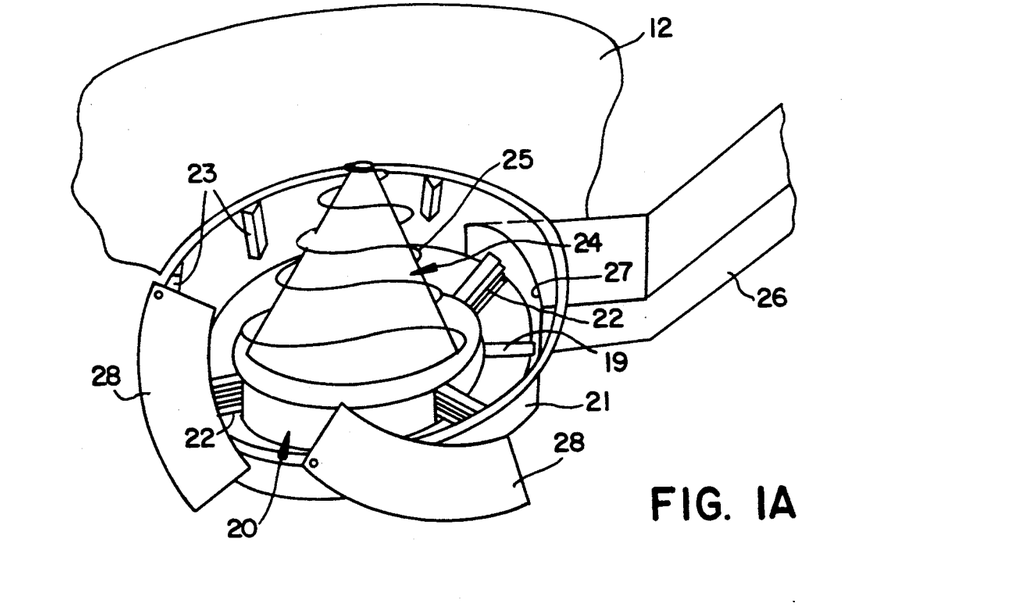
FIG. 1A is a perspective cut-away view further illustrating the embodiment of FIG. 1.

In FIGS. 1 and 1A there is illustrated an apparatus of the invention for processing various types of material to reduce particle size. Thus, in these figures the apparatus shown includes a frame member 14 which is supported by wheels 13. Hitch 15 at the front of the apparatus enables attachment to a tractor for moving the apparatus from one site to another. Power take-off shaft 18 is connectable to the power take-off of the tractor for powering the apparatus. Rotor member 20 is positioned within a circular housing 21 supported by the frame. In this embodiment the rotor member is in a horizontal plane. The rotor member 20 includes a plurality of blade members or hammers 22 attached to the periphery of the rotor. The blade members or hammers extend into a channel or chamber between the rotor 20 and the interior wall of the circular housing 21, as illustrated. Below the blade members in the housing is located a cavity which is co-extensive with the diameter of the housing.

Attached to the lowermost portion of the rotor are paddle members 19 which sweep or propel the processed material out of the lower portion of the housing (i.e., out of the cavity below the blades) and into the discharge chute 26 through an unrestricted opening in the wall 21 (i.e., there is no screen or filter or other such obstruction in the opening).

As illustrated in FIGS. 1 and 1A, the grinding channel or chamber extends completely around the rotor for a full 360°. The blade members or hammers extend outwardly from the rotor into this channel or chamber. Below this channel (i.e., below the blade member or hammers) the paddle members 19 sweep the processed material off the floor of the cavity and into the discharge chute.

A cone member 24 is attached at its base to the top of the rotor member 20. The outer surface of the cone member includes spiral fliting 25. The cone member assists in feeding material placed into hopper 12 into the channel or chamber between the wall of the circular housing 21 and the rotor 20. The angle of the cone member may vary.

The power take-off shaft 18 is adapted (by means of a gear box) to rotate the rotor about its central axis within housing 21 in a manner such that the blade members or hammers 22 at the periphery of the rotor strike the material to be processed at high speed and thereby reduce the particle size of such material. Included on the interior wall of the circular housing 21 are a plurality of deflector members 23 which deflect the material being processed away from the interior wall and into the path of the spinning blade members 22 in the channel or chamber. Material which has been processed or reduced in particle size falls to the floor of the housing 21 (i.e., into the cavity below the blades) and is blown or propelled out of a discharge opening 27 in the wall of the housing 21 and into discharge chute or spout 26, for example, by means of paddle members 19.

The processed material could also be conveyed away from the housing by means of an auger or conveyor belt. Alternatively, the processed material may be allowed to fall be conveyed away. As another possible alternative, the entire floor may be removed to allow the processed material to fall through.

The embodiment shown in FIGS. 1 and 1A is especially useful for processing materials such as grains (e.g., corn, wheat, oats, barley, milo, other small grains, etc.) or other particulate material (e.g., coal, bark, etc.). In processing such types of materials, the material is basically fed to the rotor and blade members by means of gravity. That is, the material flows downwardly into the channel or chamber between the rotor and the housing without need for pushing the material to the rotor.

When processing particulate material such as grains, etc. in the apparatus shown in FIGS. 1 and 1A, it is not necessary to include the cone member at all since gravity and centrifugal force will cause the material to become evenly distributed around the rotor. Or, if desired, a stationary cone member could be used to distribute the material around the rotor. Any type of distributor device could be used in such case, if desired at all.

Because the channel or chamber between the rotor and the housing is open around the entire circumference of the rotor, the material to be processed is fed to the entire circumference of the rotor. This feature is referred to herein as "full face feed" and it is a significant advantage over prior devices as it greatly increases the capacity of the apparatus. Because the rotor member is supported only from one direction (i.e., from the bottom when the rotor is horizontal, and from the rear side when the rotor is in a vertical plane), there are no obstructions to full face feeding.

It is possible to also process elongated or fibrous material (e.g., hay, straw, paper, etc.) in the apparatus shown in FIGS. 1 and 1A. In such event, the cone member, with the spiral fliting, assists in urging the material downwardly into the chamber between the rotor and the interior wall of the housing.

When feeding particulate material into the hopper 12 in the apparatus shown in FIG. 1A, it may be desirable at times to slow or retard the rate at which the particulate material is fed to the rotor 20 and blade members 22. For this purpose, it may be desirable to include pivoting plates 28. These plates lie in a horizontal plane above the rotor 20. When it is desired to slow or retard the rate at which the particulate material is fed into the chamber, one or more of these pivoting plates 28 may be moved toward cone member 24. This will reduce the rate at which the particulate material is pulled by gravity into the channel for processing. There may be any number of pivoting plates 28. If desired, a cover or partial cover may also be placed over the top of the hopper when processing small particulate material.

The number of positions at which the blade members or hammers 22 are attached to the periphery of the rotor 20 may vary. The number of blade members or hammers at each position may also vary. Generally speaking, the greater the number of blade members or hammers attached to the periphery of the rotor, the greater is the reduction in the particle size of the material being processed. Also, by increasing the number of blade members or hammers at each location on the rotor, the particle size of the material can be further reduced.

The 360° grinding area or channel referred to above is illustrated in the drawings. The depth of the channel or grinding area may vary, e.g., from one inch to several inches or more. At least one, and preferably all, of the blade members or hammers are positioned within this channel or grinding area.

Figure 2:
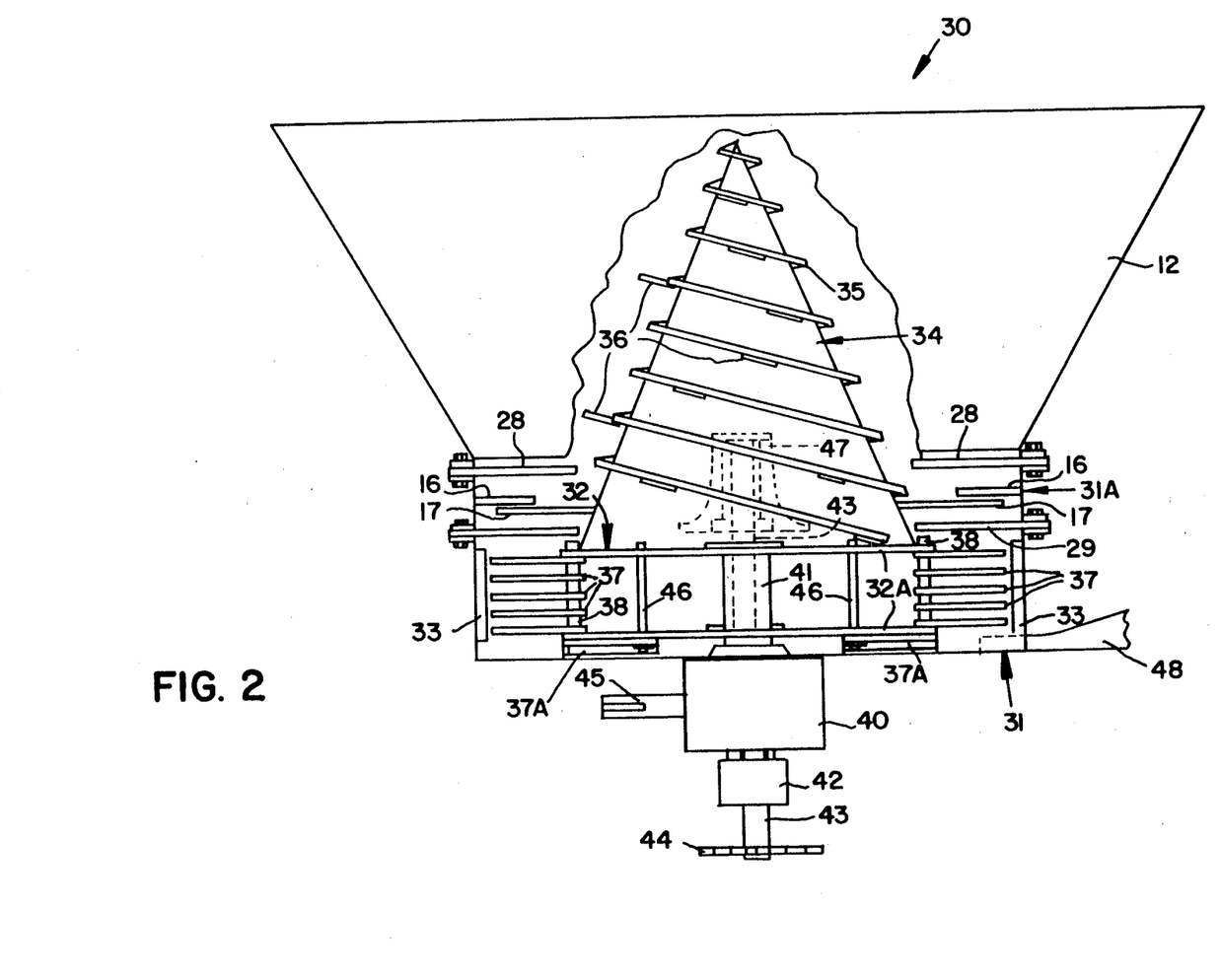
FIG. 2 is a side view, partially cut-away, illustrating another embodiment of material processor of the invention.

FIG. 2 is a side elevational view, partially cut away, of another embodiment of apparatus 30 of the invention. In this embodiment there is also a circular housing 31 which lies in a horizontal plane. Rotor member 32 is mounted within housing 31 on shaft 41 in a manner such that the rotor may be rotated relative to the housing 31. The rotor includes upper and lower plates 32A, as illustrated.

Attached to the periphery of the rotor are a plurality of blade members or hammers 37. The inner end of each blade member includes an aperture; and pin 38 passes through registering apertures in the upper and lower rotor plates and the apertures in the blade members 37 to pivotally mount each blade member or hammer to the periphery to the rotor 32 There may be any number of blade members or hammers 37 attached to the periphery of the rotor 32.

Any one or more of the blade members 37 may be pivoted inwardly and then secured by means of pin 46 passing through upper and lower plate members 32A and the outer end of such blade member or hammer. In FIG. 2 the lower blade member position where it is secured by means of a removable pin 46. By rotating or pivoting one or more blade members or hammers inwardly and securing them by means of a pin 46 it is possible to reduce the number of blade members or hammers extending into the channel or chamber between the rotor and the interior wall of the housing 31. By reducing the number of blade members or hammers in the chamber it is possible to reduce the extent to which the material being processed is reduced in particle size.

The apparatus shown in FIG. 2 also shows cone member 34 having spiral fliting 35 on its outer surface, as illustrated. If desired, a plurality of cutting knives 36 may be secured to the fliting 35 at various locations to facilitate shredding or cutting of elongated or fibrous material to be processed (e.g., hay, straw, tree branches, etc.). The knives are preferably detachably mounted so that they can be replaced if they should become worn or broken.

Hopper 12 surrounds the cone member and the upper portion of the housing 31 to serve as a reservoir for material to be processed. The rotor is driven via drive shaft 45 which is adapted to be attached to the PTO drive of a tractor, for example. Gear box 40 is adapted to drive a rotor shaft 41 which is perpendicular to the horizontal plane of the circular housing 31.

In the embodiment shown in FIG. 2 the cone member 34 may be driven separately from the rotor member 32. Thus, there is shown a drive shaft 43 having gear 44 attached to the lower end thereof. Drive shaft 43 passes upwardly through bearing housing 42 and through the hollow center of rotor shaft 41 to the hub cone support member 47 (shown in dotted lines). The cone 34 may be attached directly to the hub support 47.

Thus, the cone member 34 may be driven by means of gear 44 at any desired speed separate from the rotation of rotor member 32. For example, the gear 44 may be driven by a hydraulic motor (or even an electric motor if there is electricity available). If it is not desired to rotate the cone 34 at a different speed than rotor member 32, then the base of the cone member may be secured directly to the upper portion or surface of the rotor member 32.

FIG. 2 also illustrates the retarding plates 28 which have been moved to their inner most position in order to retard the rate at which the material to be processed is fed into the rotor 32. FIG. 2 also illustrates the provision of a plurality of knife members 17 secured to the lower portion of the cone 34 and projecting outwardly in a horizontal plane. The knife members have a sharpened leading edge and are for the purpose of pre-processing certain types of materials to reduce the particle size to a certain range before the material falls into the channel or chamber between the rotor and the wall of the housing for final processing. For example, when grinding ear corn the knives 17 first cut the ear (i.e., cob portion) to a size which allows it to fall through openings in screen 29 to reach the rotor where the cob pieces and the corn kernels are further reduced in particle size. Also, when it is desired to grind hay or paper to a very fine particle size, the knives 17 first cut the material to a certain size before it can fall through the screen and into the rotor for final processing.

The inclusion of horizontal, stationary bars 16 in close parallel proximity to the knife members 17 facilitates cutting action of the knives in this particular chamber. The bars 16 are optional, but preferred. The length of the bars is about one-half the length of the knives so that there is overlap, as shown. The bars may be positioned either above the knives, or below the knives, or both. The horizontal spacing between the knives and the bars is about 0.12 to 1 inch.

FIG. 2 further illustrates the provision of screen members 29 positioned parallel to the rotor member but spaced just above it. Each screen member 29 is pivotably mounted in a manner such that each such screen may be moved entirely out of the housing, if desired. The purpose of the screen member is to assure that the material which enters into the chamber between the rotor and the interior wall of the circular housing has been reduced to a certain particle size for further processing.

FIG. 2 also illustrates deflector members 33 on the interior wall of the housing 31. The deflector members serve only to deflect the material away from the wall and into the path of the rotating blades or hammers 37 as the material is being processed. The deflector members extend transversely along the inner wall of the circular housing. They extend partially from the top of the housing to the bottom. The deflectors can be of any desired shape (e.g., triangular, square, cylindrical, etc.). They may be sloped inwardly toward the rotor, or they may be blunt.

Figure 3:
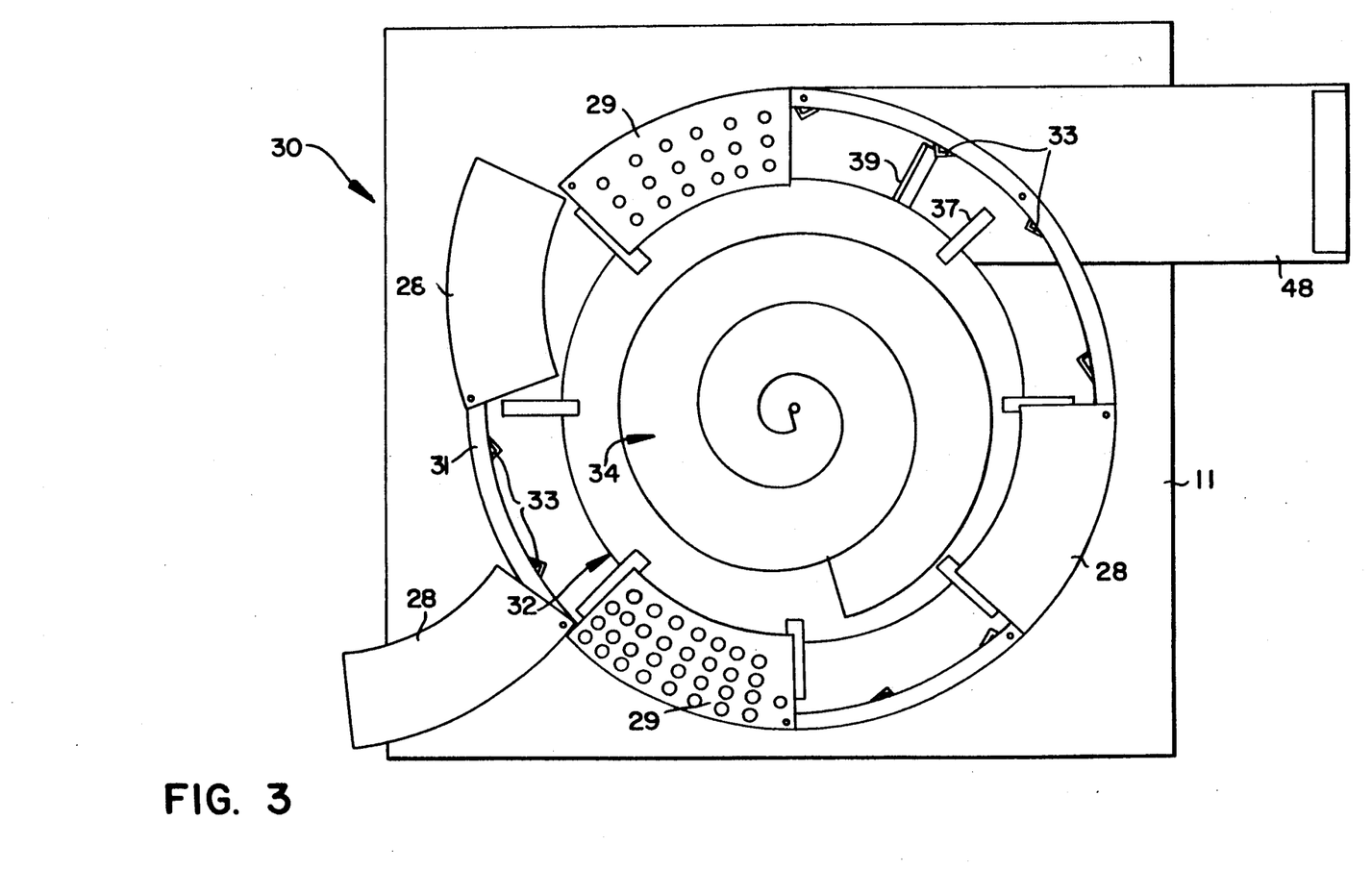
FIG. 3 is a top view of the embodiment shown in FIG. 2.

FIG. 3 is a top view of the embodiment of material processor apparatus shown in FIG. 2. There is additionally shown in this figure a discharge chute 48 which is connected to an unrestricted opening in the wall of the lower side portion of the circular housing 31. Thus, as the material is processed and falls to the cavity at the bottom of the housing 31 it is forced by way of air movement, or (by means of paddles 39 attached to the lower surface of the rotor member 32), to be propelled outwardly through discharge chute 48. Alternatively, there may be used an auger within a tube to remove the processed material. As another alternative, a conveyor belt could be used to move the processed material away from the housing. The housing 31 is shown supported on platform 11 carried by the frame.

Figure 4:
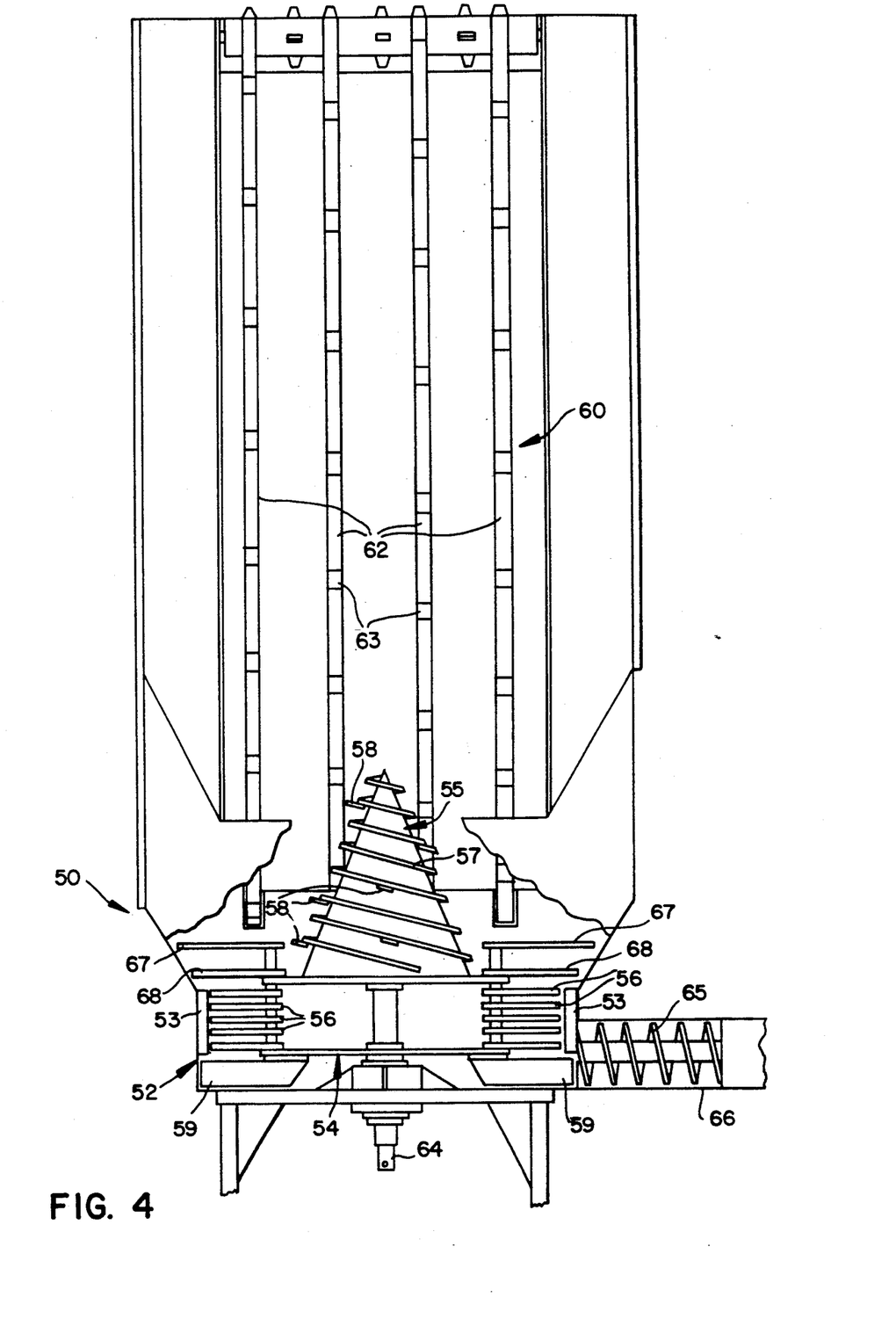
FIG. 4 is a top view, partial cut-away, of another embodiment of apparatus of the invention.

In FIG. 4 there is shown a top view, partially cutaway, of another embodiment of apparatus 50 of the invention. In this embodiment the circular housing 52 is disposed in a vertical plane. Rotor member 54 is rotatably supported within housing 52 in a vertical plane, and rotor 54 rotates about a horizontal axis at the center of the housing. As illustrated, the rotor is supported from the rear only.

The rotor member 54 includes a plurality of blade members or hammers 56 attached to its periphery. At the front portion of the rotor there are knife members 67 and 68 which may have sharpened leading edges, if desired. As with the other embodiments of apparatus of the invention, the blade members or hammers may be pivotally attached or rigidly attached to the outer edge of the rotor. The advantages to having the blade members or hammers pivotally attached are that (a) the blade members may pivot if they encounter a solid object such as a large rock or chunk of iron, etc., and (b) the blade members may be intentionally pivoted to an inward position and then secured (e.g., as illustrated in FIG. 2).

Cone member 55 is secured at its base to the surface of the rotor member 54. The cone includes spiral fliting 57 on its outer surface. Preferably knives 58 are secured at various places to fliting 57. The knives 58 facilitate the tearing or loosening of bulky material or fibrous material being processed so that smaller chunks or particles of material are fed to the rotor for processing. That is, the cone 55 serves as a pre-processor for entangled material, compacted or compressed material, or fibrous materials.

As with the other embodiments of the invention, the rotor 54 and blade members 56, 67 and 68 are exposed throughout the entire circumference of the rotor so that the material being processed is fed to the full face of the rotor. The cone 55 facilitates the even feeding of the material around the periphery of the rotor. The circular housing includes a portion which extends 360° around the rotor to define an annular channel or chamber therebetween.

Trough 60 forms a platform for the material to be processed. Drive chains or aprons 62 are driven along the length of the trough to force the material into the cone and the rotor. There may be a plurality of such drive chains 62 which move toward the rotor on the floor of the trough and then return to the other end of the trough underneath. The drive chains preferably include teeth or hooks 63 to facilitate gripping of the bulk material being moved in the trough. The length and width of the trough may vary. Generally speaking, it is preferred that the width of the trough be no wider than the width of the rotor member and blade members attached to the periphery of the rotor member. Normally the trough is in a horizontal plane when the rotor is in a vertical plane.

The rotor member is adapted to be driven by means of shaft 64 which may be powered by the power-take-off shaft of a tractor, or it may be powered by an engine mounted directly on the frame of the apparatus 50.

The circular housing 52 includes a cavity rearwardly of the blade members on the rotor. An opening in the wall of the housing adjacent the cavity serves as a discharge opening for the material which has been reduced in particle size. In the embodiment shown in FIG. 4 one side of the rotor member includes paddles 59 which serve to push the processed material out of the cavity through the discharge opening in the housing 52. Then the processed material may be conveyed away from the housing by means of a conveyor. In FIG. 4 there is illustrated an auger 65 within tube 66 for conveying away the processed material. As another example of conveyor means, it is possible to use a moving belt in place of the auger to remove the processed material. As another example, the paddles may throw the processed material out through a tube or pipe connected to the housing. This feature is illustrated in dotted lines 61 in FIGS. 5 and 6.

Figure 5:
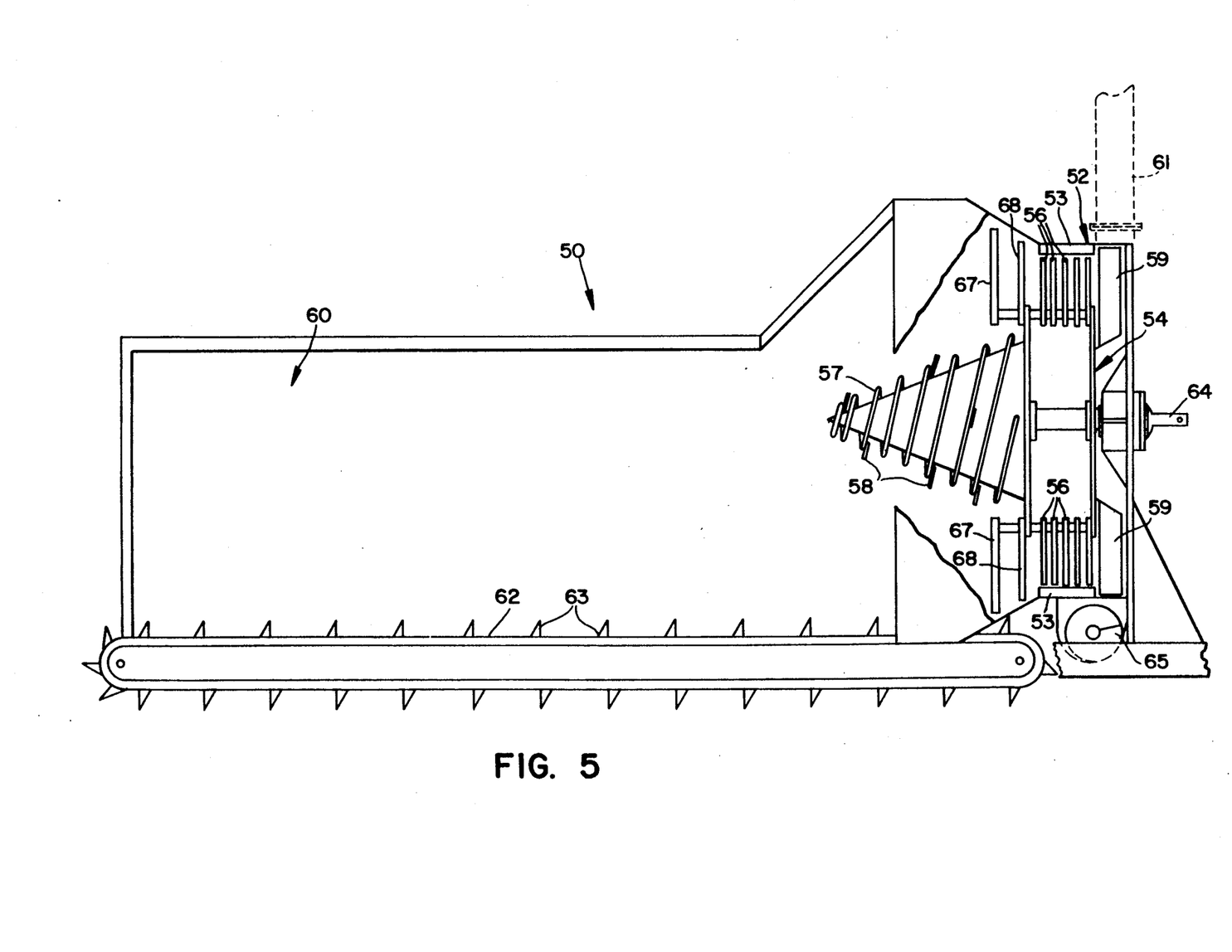
FIG. 5 is a side view, partial cut-away, of the embodiment shown in FIG. 4.

FIG. 5 is a side elevational view of the apparatus 50 shown in FIG. 4. Thus, there is shown rotor member 54 within housing 52. Cone member 55 is secured to one face of the rotor 54 (the feed side of the rotor). Drive chain 62 is shown in trough 60. Attached to the drive chain at various intervals are teeth or hook members 63. The speed at which the drive chain urges the material to the rotor can be adjusted so that the material is fed at the maximum rate at which the rotor can process it. Preferably, a conventional hydraulic governor system is used to control the speed of the drive chain.

Figure 6:
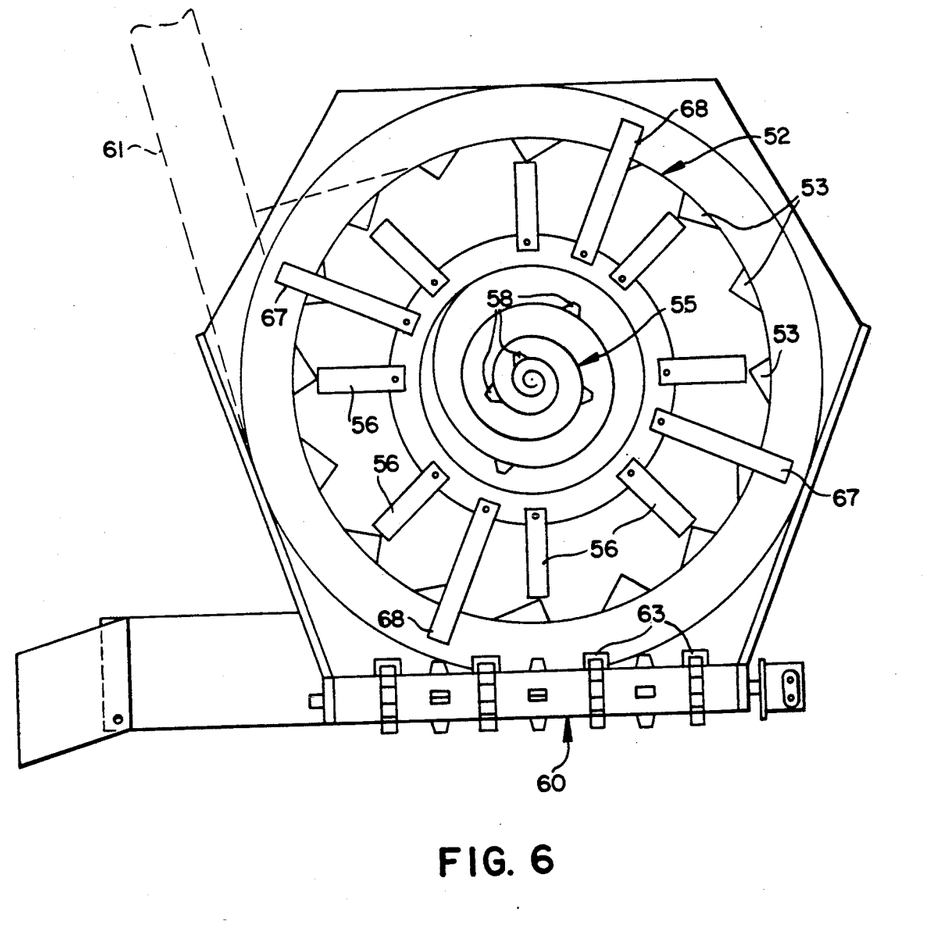
FIG. 6 is an end view of the embodiment of apparatus shown in FIG. 4.

FIG. 6 is an end view of the apparatus 50 shown in FIG. 4, looking directly into the cone 55 and the rotor 54 within circular housing 52. If desired, flexible flaps may be supported from the upper side of the frame or shroud within which the cone is located to inhibit stray material from flying outwardly.

Figure 7:
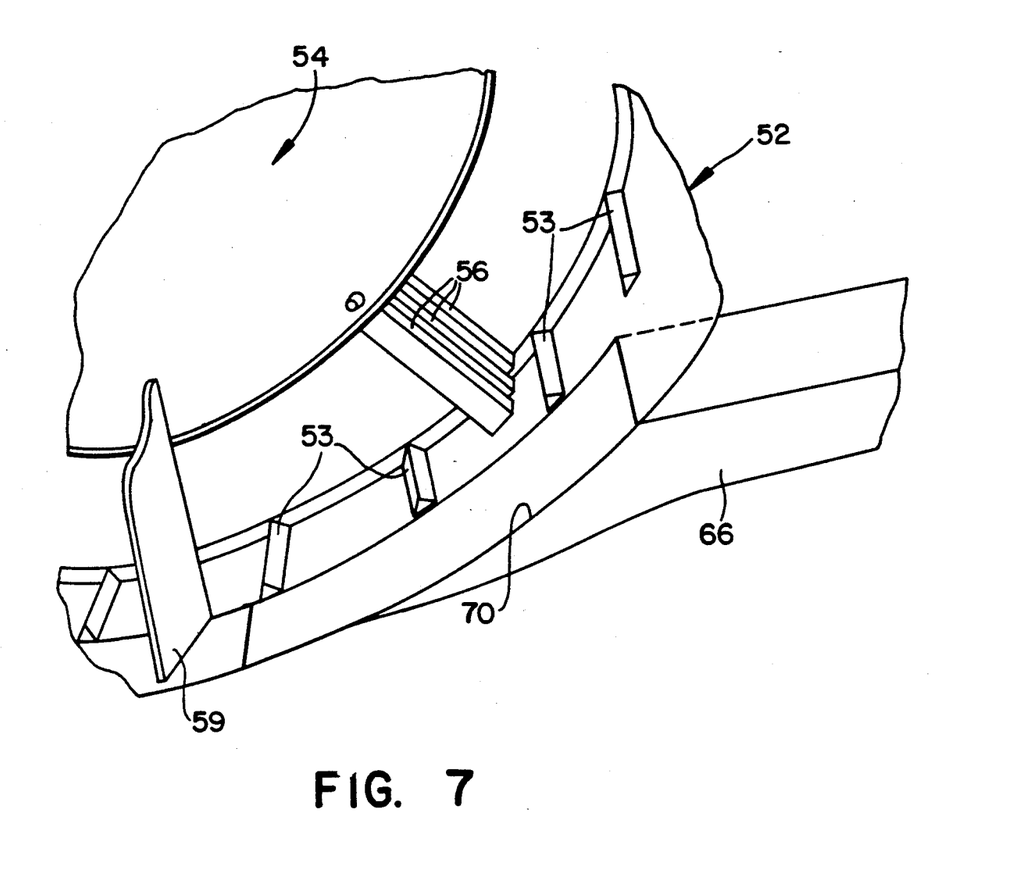
FIG. 7 is a perspective view further illustrating a portion of the apparatus shown in FIG. 4.

FIG. 7 is a perspective view illustrating in more detail the rear face of the rotor member 54, blade members 56, and circular housing 52 of the apparatus 50 shown in Figure 4. Along the interior wall of the circular housing there are a plurality of deflectors 53 which extend transversely along the wall of the housing across the grinding channel or chamber. Rearwardly of this area is the cavity and the unrestricted discharge opening 70 through which the processed material is pushed by the paddles 59.

Figure 8:
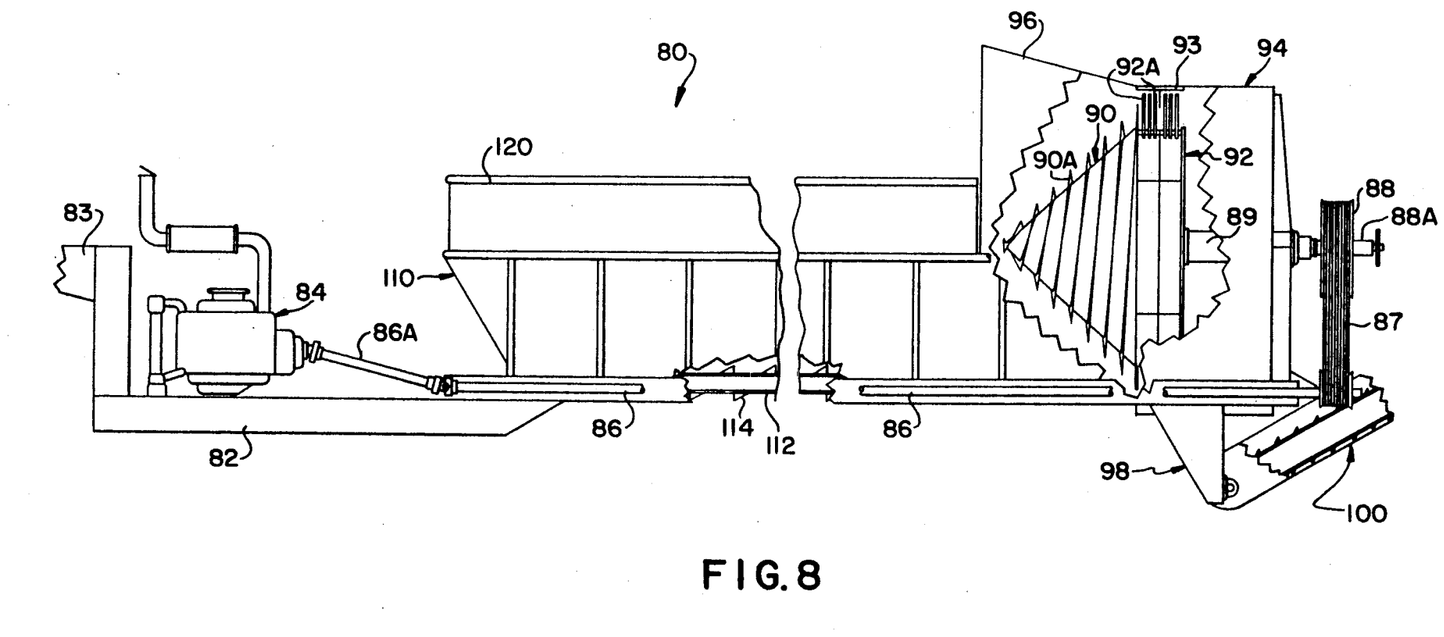
FIG. 8 is a side elevational, partial cut-away, view illustrating another embodiment of apparatus of this invention.

FIG. 8 is a side elevational, partial cut-away, view illustrating another embodiment of apparatus 80 of the invention. This embodiment comprises a truck bed or frame 82 including tongue or hitch portion 83 at one end for towing behind a truck. Wheels (not shown) are positioned under the rearward end of the bed. An engine 84 (e.g., gasoline or diesel) is mounted on the frame 82 to power the grinding apparatus.

A power shaft 86 (operably connected to engine 84 by shaft 86A) transmits rotational power from the engine to the rear portion of the apparatus. Belts 87 are connected between a pulley at the end of shaft 86 and pulley 88 on drive shaft 88A. Rotor member 92 is attached to the shaft 89 which is rotatably driven by shaft 88A.

Housing 94 which is circular in cross-section surrounds the rotor. One or more deflector bars 93 may be fastened to the inner wall of the housing adjacent the ends of the blades 92A carried by the rotor, if desired, for deflecting material away from the wall of the housing and back to the blades during operation.

As illustrated, there is a circular cavity within the housing rearwardly of the rotor (i.e., on the discharge side of the rotor). A cone member 90 is attached to the opposite side of the rotor (i.e., on the feed side). The cone member includes spiral fliting 90A. If desired, one or more knives may be secured to the fliting to assist in loosening bulk material as it is fed to the cone.

On the lower rearward side of the housing there is a discharge opening through which the processed material falls into collector 98. A conveyor or elevator 100 is operably connected to the collector to convey the processed material away from the collector.

A trough or hopper 110 in front of the cone 90 is adapted to receive large bales or other forms of bulk material to be processed. It includes one or more endless conveyor chains 112 having teeth or projections 114 thereon to advance the bulk material along the hopper and to the cone and rotor. Preferably there is a pivoting side board 120 on one or both side edges of the hopper to assist in retaining the bulk material in the hopper during processing. One side edge may be pivoted downwardly to facilitate loading of bulk material (e.g., large bales of hay) into the hopper.

Housing 96 flares outwardly as illustrated and surrounds cone 90. The opening to housing 96 is sufficiently large (e.g., 8 feet or more) to accommodate and receive large bales to be processed. If desired, one or more flexible flaps may be suspended from the upper edge of housing 96 to reduce or inhibit any stray material from passing outwardly from the cone.

The length of the frame and the hopper may vary, as desired. Also, the diameter of the rotor and he housing may also vary. The apparatus illustrated is capable of processing several tons per hour of bulk material such as baled hay, straw and the like, very efficiently and smoothly. The apparatus is far more efficient than conventional tub grinders which are used for processing such materials.

The apparatus of this invention can be made in various sizes. For example, useful devices can be made in which the diameter of the rotor member (including blade members or hammers) can be as small as 18 inches or as large as 20 feet or more. The length of the blade members or hammers may also vary, for example, from about one inch to 20 inches or more.

The number of blade members or hammers at each desired location on the periphery of the rotor may vary from one to several (e.g., 6), depending upon the desired reduction in particle size of the material being processed.

The blade members or hammers are preferably made of steel. The leading edge of each may be blunt or sharpened. Alternatively, the leading edge of the upper or front blade members on the rotor may be sharpened while the remaining blade edges are blunt.

The rotor may also include broad-faced paddle members on the lower edge (for horizontal rotors) or in the rear most position (for vertical rotors) to sweep or propel the processed material out of the cavity and through the discharge opening in the housing. The paddle member can be rigidly or pivotally fastened to the rotor.

The clearance between the outer end of the blade members and the deflectors present on the inner wall of the housing is at least about 0.25 inch and may be about 0.75 inch, although this amount of clearance is not critical.

The spacing between adjacent blade members or hammers at each location on the rotor may also vary. Also, the depth of the housing may vary, e.g., from about one inch to 2 feet or more.

The speed at which the rotor is rotated within the housing may vary. It has been found, however, that the preferred tip speed for the blade members or hammers is in the range of about 100,000 to 150,000 inches per minute for optimum results.

It is also possible for the blade members to include a twist along their length so that they cause air to flow transverse to the rotor from the feed side to the discharge side.

The deflectors on the interior wall of the housing may vary in size, shape and spacing. The deflectors deflect the material being processed away from the wall of the housing in the channel or grinding chamber and into the path of the blade members or hammers where it can be reduced in particle size. If the material being processed is manure or compost material or the like, it is not necessary to include such deflectors on the interior wall of the housing.

Figure 9A:
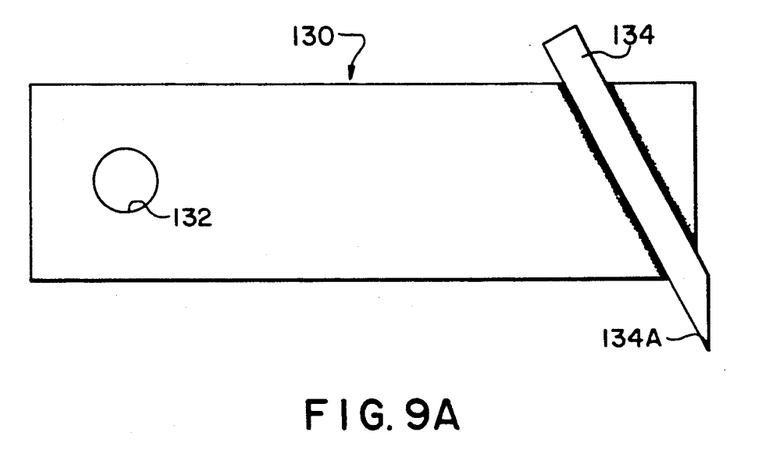
FIG. 9A is a top view of one embodiment of blade member which is useful in certain versions of the apparatus described herein.
Figure 9B:
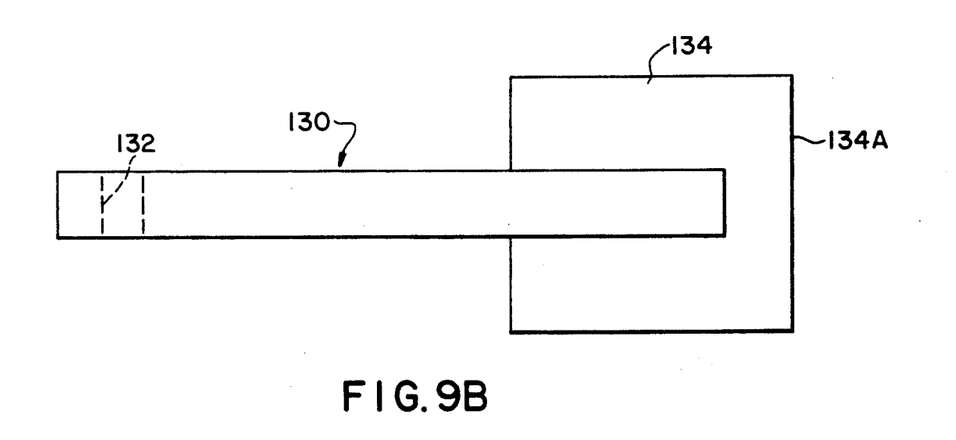
FIG. 9B is a side elevational view of the blade member shown in FIG. 9A.

In such situations it is desirable to use blades having a shoe on their outer end such as illustrated in FIG. 9A (top view) and FIG. 9B (front view). The blade 130 includes an aperture or opening 132 at one end for attachment to the rotor member. An angled, upstanding shoe 134 is secured (e.g., by welding) to the free end of the blade. The leading end 134A of the shoe is tapered as illustrated.

The shoe 134 effectively scrapes the manure, dirt, compost, or other material being processed off of the inner wall of the housing. This prevents the material from building up or caking on the housing wall during processing. Preferably the leading end 134A runs as close as possible to the inner wall of the housing (e.g., within about 0.1 to 0.3 inches). The size and shape of the shoe may vary, of course.

The fliting on the surface of the cone member is preferably spiral, although it could be otherwise. For example, the fliting could be in the form of several individual flites which are perpendicular to the rotor. As another alternative, the fliting could be individual flites which are oriented at an angle to the rotor. Preferably the fliting includes knives or sharp protrusions for loosening bulk material before it proceeds into the channel or chamber between the rotor and the interior wall of the housing.

The cone member also distributes the material around the entire periphery of the rotor. This assures that the rotor works at maximum capacity in processing the material. Preferably the rotor is completely exposed and accessible on its periphery to allow the material to be fed into the channel or chamber at all points around the rotor (i.e., a full face feed of 360°). The advantages provided by the apparatus of this invention are also obtained even if there is substantial full face feed of material to the rotor. In other words, even if there is a small portion of the rotor periphery which is not available to receive material to be processed, the cone member nevertheless will distribute the material around the accessible portion of the periphery of the rotor to use the maximum portion of the capacity of the rotor.

The height of the cone member may also vary. Generally speaking, it is preferred for the cone to project outwardly from the rotor a distance equal to about one-half to 1.5 times the diameter of the rotor.

The apparatus of the invention can be adapted to process materials of all types and sizes. For example, it may be used to reduce particle size of small particulate material, or materials of intermediate size (e.g., ear corn), or materials of large size, including stringy, entangled and fibrous materials such as hay, straw, paper, cardboard, etc. Even very large bales of material may be fed to the apparatus in whole form (e.g., square bales as large as 4 feet by 4 feet by 8 feet, or round bales up to 8 feet in diameter). Various other types of materials may also be processed, e.g., tree branches, bark, coal, PC boards, refuse, etc.

The apparatus of the invention can be used to reduce material to any desired particle size by varying the number of blade members or hammers on the periphery of the rotor, the spacing between blade members or hammers, etc. The apparatus described herein is much more efficient than prior types of grinding devices (e.g., requiring 20–35% less power than with previous devices). The uniformity of the processed material is also very good and is consistently more uniform than possible with conventional machines.

Other variations are possible without departing from the scope of the present invention.

What is claimed is:

1. Apparatus for processing material to reduce the particle size thereof, said apparatus comprising:
   (a) a housing including a circular interior wall;
   (b) a rotor member being adapted to be rotatably driven within said housing; said rotor member including a feed side and discharge side; wherein said rotor member is supported solely at said discharge side;
   (c) a plurality of blade members having first and second ends, wherein said first end of each said blade is attached to said rotor and is second end of each said blade extends outwardly from said rotor;

(d) drive means adapted to drive said rotor in a rotatable manner within said housing;

(e) feed means adapted to feed said material to said feed side of said rotor in full face feed; wherein said feed means comprises a cone member, wherein the base of said cone member is attached to said rotor, and wherein said cone member includes spiral fliting;

wherein an annular channel is defined between said interior wall of said housing and said rotor member; wherein said blade members project into said channel when said rotor member is rotated; wherein said cavity is defined within said housing rearwardly of said blade members to receive material processed by said rotor member; and wherein an unrestricted said charge opening is disposed adjacent said cavity to allow exit of processed material from said housing.

2. Apparatus in accordance with claim 1, wherein said interior wall of said housing includes a plurality of deflectors which are adapted to deflect said material away from said interior wall and into the path of said blade members when said rotor is being rotated.

3. Apparatus in accordance with claim 1, wherein said blade members are pivotably attached to said rotor.

4. Apparatus in accordance with claim 3, further comprising lock means adapted to lock at least one of said blade members to said rotor in a manner such that it cannot project into said channel when said rotor member is rotated.

5. Apparatus in accordance with claim 1, wherein at least two of said blade members have sharpened leading edges.

6. Apparatus in accordance with claim 1, further comprising conveyor means which is adapted to communicate with said discharge opening and which is further adapted to convey particles of said material away from said discharge opening and said housing.

7. Apparatus in accordance with claim 1, further comprising knives attached to said fliting.

8. Apparatus in accordance with claim 1, wherein said rotor member rotates about a horizontal axis, and wherein said feed means further comprises a trough with a movable apron therein, wherein said apron is adapted to move said material along said trough to said rotor member.

9. Apparatus for processing material to reduce the particle size thereof, said apparatus comprising:

(a) a cylindrical housing including an interior wall;

(b) a rotor member which is disposed within said housing and which is adapted to be rotatably driven about a vertical axis; said rotor member including a feed side and discharged side; wherein said rotor member is supported so¹ly at said discharge side;

(c) a plurality of blade members having first and second ends, wherein said first end of each said blade is attached to said rotor and said second end of each said blade extends outwardly from said rotor;

(d) drive means adapted to drive said rotor in a rotatable manner within said housing;

(e) feed means adapted to feed said material to said feed side of said rotor in full face feed; wherein said feed means comprises a cone member, wherein the base of said cone member is attached to said rotor, and wherein said cone member includes spiral fliting;

wherein ann annular channel is defined between said interior wall of said housing and said rotor member; wherein said blade members project into said channel when said rotor member is rotated; and wherein a cavity is disposed below and rearwardly of said blade members and said annular channel to receive processed material; and wherein an unrestricted discharge opening is disposed adjacent said cavity to allow exit of processed material from said housing.

10. Apparatus in accordance with claim 9, wherein said feed means comprises an upstanding wall member which has upper and lower edges, said lower edge being connected to said housing and said upper edge being disposed above said housing, wherein said upstanding wall member defines a hopper above said rotor.

11. Apparatus in accordance with claim 9, wherein said interior wall of said housing includes a plurality of deflectors which are adapted to deflect said material away from said interior wall and into the path of said blade members when said rotor is being rotated.

12. Apparatus in accordance with claim 11, wherein each said deflector projects inwardly from said interior wall a distance in the range of about 0.5 to 6 inches.

13. Apparatus in accordance with claim 10, further comprising retarding means adapted to control the rate at which said material is fed to said rotor in said housing.

14. Apparatus in accordance with claim 9, wherein said rotor has a diameter in the range of about 18 inches to 20 feet.

15. Apparatus in accordance with claim 9, further comprising conveyor means which is adapted to communicate with said discharge opening and which is further adapted to convey particles of said material away from said discharge opening and said housing.

16. Apparatus in accordance with claim 9, wherein said cone member has attached to the periphery thereof a plurality of knife members; wherein said apparatus further comprises screen means disposed between said knife members and said rotor member; wherein said knife members are adapted to cut said material to a size enabling said material to pass through said screen means and into said channel where said blade members are adapted to further reduce the particle size of said material.

17. Apparatus for processing material to reduce the particle size thereof, said apparatus comprising:

(a) a cylindrical housing including an interior wall;

(b) a rotor member which is disposed within said housing and which si adapted to be rotatably driven about a horizontal axis; said rotor member including a feed side and a discharge side; wherein said rotor member is supported solely at said discharge side;

(c) a plurality of blade members having first and second ends, wherein said first end of each said blade is attached to said rotor and said second end of each said blade extends outwardly from said rotor;

(d) drive means adapted to drive said rotor in a rotatable manner within said housing;

(e) feed means adapted to feed said material to said feed side of said rotor in full face feed; wherein said feed means comprises a cone member, wherein the base of said cone member is attached to said rotor, and wherein said cone member includes spiral fliting;

wherein an annular channel is defined between said interior wall of said housing and said rotor member; wherein said blade members project into said channel when said rotor member is rotated; wherein a cavity is defined within said housing rearwardly of said blade members to receive material processed by said rotor member; and wherein an unrestricted discharge opening is disposed adjacent said cavity to allow exit of processed material from said housing.

18. Apparatus in accordance with claim 17, wherein said spiral fliting includes knives attached thereto.

19. Apparatus in accordance with claim 17, wherein said interior wall of said housing includes a plurality of deflectors which are adapted to deflect said material away from said interior wall and into the path of said blade members when said rotor is being rotated.

20. Apparatus in accordance with claim 17, wherein said feed means further comprises a trough with a movable apron therein, wherein said apron is adapted to move said material along said trough to said rotor member.

21. Apparatus in accordance with claim 17, further comprising conveyor means which is adapted to communicate with said discharge opening and which is further adapted to convey particles of said material away from said discharge opening and said housing.

* * * * *